United States Patent
Ohoshi et al.

(10) Patent No.: US 8,795,805 B2
(45) Date of Patent: Aug. 5, 2014

(54) OPTICAL DISC RECORDING MEDIUM AND METHOD OF MANUFACTURING OPTICAL DISC

(75) Inventors: Toshio Ohoshi, Kanagawa (JP); Reynard Tanuprayogi, Kanagawa (JP); Jun Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 12/497,902

(22) Filed: Jul. 6, 2009

(65) Prior Publication Data

US 2010/0028590 A1    Feb. 4, 2010

(30) Foreign Application Priority Data

Aug. 1, 2008    (JP) ................................. 2008-199647

(51) Int. Cl.
    *G11B 7/24*    (2013.01)
(52) U.S. Cl.
    USPC ........... 428/64.4; 427/258; 427/346; 427/557
(58) Field of Classification Search
    USPC ................. 428/64.4, 64.7; 427/557, 346, 258
    See application file for complete search history.

(56) References Cited

U.S. PATENT DOCUMENTS

| 7,820,234 B2 * | 10/2010 | Hayashi et al. | ............... 427/162 |
| 2004/0232570 A1 * | 11/2004 | Hayashi et al. | ................ 264/1.1 |

FOREIGN PATENT DOCUMENTS

| JP | 2008-21353 | 1/2008 |
| WO | WO 02/101736 A1 | 12/2002 |

* cited by examiner

*Primary Examiner* — Gerard Higgins
(74) *Attorney, Agent, or Firm* — Sony Corporation (57) ABSTRACT

An optical disc recording medium includes a disc substrate, at least one recording layer which is disposed on one surface side of the disc substrate, a cover layer which is disposed on a laser incident surface side of the recording layer and which is composed of a light-transmissive resin layer, and a hard coat layer which is disposed for surface protection on a laser incident surface side of the cover layer and which is composed of a light-transmissive resin layer. The cover layer is formed such that its thickness decreases from the central portion to the peripheral portion of the disc, the hard coat layer is formed such that its thickness increases from the central portion to the peripheral portion, and the total thickness of the cover layer and the hard coat layer is substantially uniform from the central portion to the peripheral portion.

17 Claims, 8 Drawing Sheets

OPTICAL DISC RECORDING MEDIUM AND METHOD OF MANUFACTURING OPTICAL DISC

BACKGROUND OF THE INVENTION

1. Field of the Invention

The present invention relates to a structure of an optical disc recording medium and a method of manufacturing an optical disc.

2. Description of the Related Art

In recent years, the recording density and capacity of optical discs, which are one type of optical information recording media, have been increased with the increasingly widespread use of personal computers, the introduction and increasingly widespread use of digital terrestrial broadcasting, and accelerated spread of high-definition televisions to ordinary homes. There have been provided optical disc recording media that are capable of recording a larger amount of information, for example, compact discs (CDs), digital versatile discs (DVDs), and Blu-ray Discs (Registered Trademark). Even now, further increases in the recording density and capacity are desired.

A Blu-ray Disc, which is a high-capacity optical disc recording medium, is an optical disc having a diameter of about 12 cm and a thickness of about 1.2 mm. In such a Blu-ray Disc, a recording layer is formed by laminating, in the thickness direction, a metal thin film, a dielectric film, etc. on a surface of a substrate with a thickness of about 1.1 mm, the surface having irregularities. A cover layer with a thickness of about 0.1 mm is provided thereon. Such a Blu-ray Disc has a recording capacity of about 25 GB (gigabytes).

In order to further increase the capacity, multilayer discs including a plurality of recording layers have been developed. A method of manufacturing a multilayer Blu-ray Disc is, for example, described in Japanese Unexamined Patent Application Publication No. 2003-22586. In general, such a disc is manufactured by a method described below.

As an example, a method of manufacturing a two-layer disc including two recording layers will be described below. First, a first recording layer L0 is formed by forming a metal thin film or by depositing a thermally recordable, thin film material or the like on a surface of a resin-molded substrate (disc substrate) with a thickness of about 1.1 mm, the surface having irregularities composed of pits and a groove. Next, a spacer layer with a thickness of several microns to several tens of microns is formed on the recording layer on the substrate, the spacer layer separating the two recording layers. Next, a stamper which has a surface having irregularities composed of pits and a groove is pressed onto the spacer layer so that the pits and the groove are transferred onto the spacer layer. Next, a second recording layer L1 is formed by forming a metal thin film having a predetermined transmittance with respect to the wavelength of the recording/reproducing laser beam or by depositing a thermally recordable, thin film material on the pits and groove transferred onto the spacer layer. Then, a protective layer (cover layer) which protects the second recording layer L1 is formed on the second recording layer L1.

In the case where the number of recording layers is increased to three or more, for example, as described in Japanese Unexamined Patent Application Publication No. 2007-257759, a method is used, in which while taking into consideration interlayer crosstalk during recording and reproducing of signals, the step of forming the second recording layer L1 is repeated several times, thereby, for example, laminating a third recording layer L2 and a fourth recording layer L3 in that order.

In the multilayer Blu-ray Disc thus manufactured, in order to reduce the influence of signal degradation due to the inclination of the disc, it is necessary to form the laminated recording layers within a thickness range of 0.1 mm. In the two-layer disc described above, the second recording layer L1 is formed on the first recording layer L0 through a spacer layer with a thickness of several microns to several tens of microns, and a light-transmissive protective layer is formed thereon.

Furthermore, in the multilayer Blu-ray Disc, in order to ensure homogeneous recording and reading from the innermost periphery toward the outermost periphery of the substrate, the spacer layer provided between the first recording layer L0 and the second recording layer L1 is desired to have homogeneity and uniformity of optical properties and physical dimensions. The protective layer (cover layer) continuously formed on the upper surface of the second recording layer L1 is also desired to have homogeneity and uniformity of optical properties and physical dimensions. At the same time, there is a demand for an inexpensive method of manufacturing media. Furthermore, since one of the major intended uses of such optical disc recording media is long-term storage, it is expected that recorded information is retained for a long period of time. Therefore, there is a demand for a multilayer structure which can have good recording characteristics even in a high temperature, high humidity environment or in a low temperature environment.

As described above, a cover layer composed of a light-transmissive resin layer is provided as a protective layer for the recording layer on the surface side (laser incident surface side) of one of a plurality of recording layers. A spin coating method has been used as a method for applying a light-transmissive resin to a predetermined area.

In the spin coating method, formation of a uniform coating film is a major challenge, and various techniques have been disclosed. For example, Japanese Unexamined Patent Application Publication No. 8-164355 proposes a method in which a uniform film thickness is achieved by producing a uniform airflow during high speed rotation, and Japanese Unexamined Patent Application Publication Nos. 9-173946, 2002-153800, and 2006-95452 each propose a method in which in order to improve the nonuniformity of the coating thickness in the central portion of the substrate, by inclining the axis of rotation, gravity is also used in addition to centrifugal force. Furthermore, Japanese Unexamined Patent Application Publication No. 2008-21353 discloses a technique in which a cover layer is composed of a first layer formed by spin coating and a second layer formed by spin coating, and the thickness of the layer including the two layers is made uniform.

SUMMARY OF THE INVENTION

Uniformity in the thickness of the cover layer is also an important factor in view of accurate recording and reproduction of information. As described above, with respect to the formation of the cover layer by the spin coating method, various techniques have been devised so that a coating film can be formed uniformly from the innermost periphery to the outermost periphery. Furthermore, in addition to the cover layer, a hard coat layer with a thickness of about 1 to 5 μm is disposed for surface protection on the surface (laser incident surface side) of the cover layer. The hard coat layer is a protective layer composed of a material that improves the surface strength in view of handling by the user of the disc in a bare disc state. The hard coat layer is also formed by the spin-coating method, and uniformity in the thickness thereof is important.

Therefore, during the formation of the cover layer and during the formation of the hard coat layer, in order to obtain uniformity in the thickness of coating films, it has been necessary to perform precise control of a coating apparatus, heat rays from an IR heater, etc. Consequently, the manufacturing process has an increased level of difficulty, leading to decreases in production efficiency and disadvantages in terms of cost.

It is desirable to provide a method of manufacturing an optical disc recording medium having a structure including a cover layer and a hard coat layer, efficiently with low cost and with high quality.

An optical disc recording medium according to an embodiment of the present invention includes a disc substrate, at least one recording layer which is disposed on one surface side of the disc substrate, a cover layer which is disposed on a laser incident surface side of the recording layer and which is composed of a light-transmissive resin layer, and a hard coat layer which is disposed for surface protection on a laser incident surface side of the cover layer and which is composed of a light-transmissive resin layer. The cover layer is formed such that its thickness decreases from the central portion to the peripheral portion of the disc, the hard coat layer is formed such that its thickness increases from the central portion to the peripheral portion of the disc, and the total thickness of the cover layer and the hard coat layer is substantially uniform from the central portion to the peripheral portion of the disc.

Furthermore, preferably, in the optical disc recording medium, a plurality of recording layers are disposed as the recording layer between the disc substrate and the cover layer.

Furthermore, preferably, in the optical disc recording medium, the cover layer is formed such that its thickness decreases from the central portion to the peripheral portion of the disc at an inclination rate of 90% or more, the inclination rate being defined as a percentage of the thickness of the outer peripheral portion relative to the thickness of the central portion of the cover layer.

Furthermore, preferably, in the optical disc recording medium, the hard coat layer is formed such that its thickness increases from the central portion to the peripheral portion of the disc at an inclination rate of 300% or less, the inclination rate being defined as a percentage of the thickness of the outer peripheral portion relative to the thickness of the central portion of the hard coat layer.

A method of manufacturing an optical disc according to an embodiment of the present invention includes the steps of molding a disc substrate, forming at least one recording layer on one surface side of the disc substrate, forming a cover layer composed of a light-transmissive resin layer on a laser incident surface side of the recording layer such that the thickness of the cover layer decreases from the central portion to the peripheral portion of the disc, and forming a hard coat layer composed of a light-transmissive resin layer for surface protection on a laser incident surface side of the cover layer such that the thickness of the hard coat layer increases from the central portion to the peripheral portion of the disc, and the total thickness of the cover layer and the hard coat layer is substantially uniform from the central portion to the peripheral portion of the disc.

That is, according to the embodiment of the present invention, the cover layer is formed such that its thickness is not uniform, but its thickness decreases from the central portion to the peripheral portion of the disc. Furthermore, the hard coat layer is formed such that its thickness increases from the central portion to the peripheral portion of the disc, and the total thickness of the cover layer and the hard coat layer is made uniform.

When a film is formed by spin-coating, although depending on the resin material, the speed of rotation, etc., the thickness of the outer peripheral portion side is usually larger. Therefore, it has been necessary to perform precise control in order to obtain uniformity in the thickness of coating films. The cover layer can be formed such that its thickness decreases from the central portion toward the outer peripheral portion by control of heat rays from an IR heater or the like, as in the control for obtaining uniformity in thickness. Meanwhile, the hard coat layer is formed such that its thickness increases from the central portion toward the outer peripheral portion in the usual manner by spin-coating, and thus precise control is not particularly necessary. For example, only by setting the number of rotations, a change in the thickness corresponding to the inclination of the cover layer can be realized.

According to any of the embodiments of the present invention, it is possible to manufacture an optical disc recording medium efficiently, with high process consistency, with low cost, and with high quality.

DESCRIPTION OF THE PREFERRED EMBODIMENTS

The embodiments of the present invention will be described with reference to the drawings. In an embodiment, a multilayer optical disc including four recording layers is taken as an example.

Figure 1A:
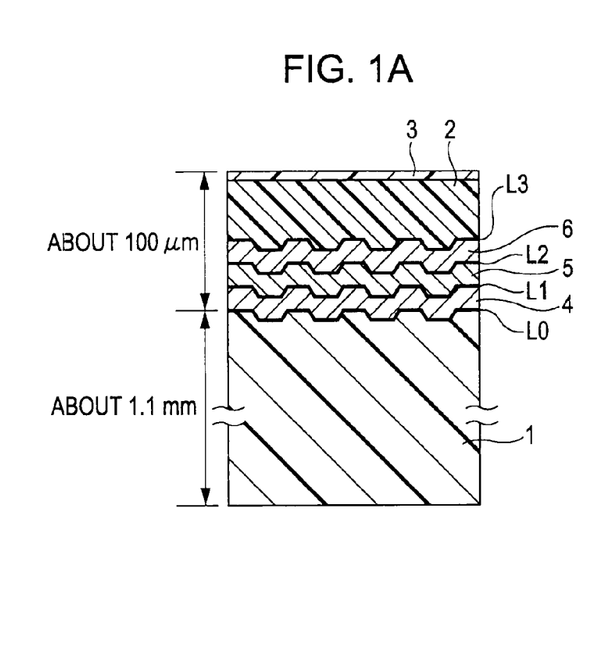
FIGS. 1A and 1B are cross-sectional views each showing a layer structure of an optical disc according to an embodiment of the present invention.

First, a layer structure of the optical disc will be described with reference to FIGS. 1A and 1B. FIG. 1A is a partial cross-sectional of the optical disc including four recording layers L0, L1, L2, and L3 according to this example.

The optical disc includes a disc-shaped resin-molded substrate (disc substrate) 1 with a thickness of 1.1 mm and an outer diameter of about 120 mm, and four recording layers L0, L1, L2, and L3 disposed on one surface side of the resin-molded substrate 1. In FIGS. 1A and 1B, the upper surface corresponds to a laser incident surface on which laser beams are incident during recording/reproducing.

As shown in FIG. 1A, a first recording layer L0 is formed on the resin-molded substrate 1 with a thickness of 1.1 mm. A second recording layer L1 is formed on the first recording layer L0 through a first spacer layer with a predetermined thickness (e.g., 19 μm). A second spacer layer 5 with a predetermined thickness (e.g., 11 μm) is formed thereon, and then a third recording layer L2 is formed. A third spacer layer 6 with a predetermined thickness (e.g., 15 μm) is further formed thereon, and then a fourth recording layer L3 is formed.

Then, a cover layer 2 with a predetermined thickness (e.g., 53 μm) is formed, and a hard coat layer 3 having resistance to fingerprints, contaminants, and scratches is further formed thereon with a thickness of about 2 μm. Thus, a four-layer optical disc is constituted. That is, the recording layer L0, the spacer layer 4, the recording layer L1, the spacer layer 5, the recording layer L2, the spacer layer 6, the recording layer L3, the cover layer 2, and the hard coat layer 3 are formed within a thickness of about 100 μm on the resin-molded substrate.

Figure 1B:
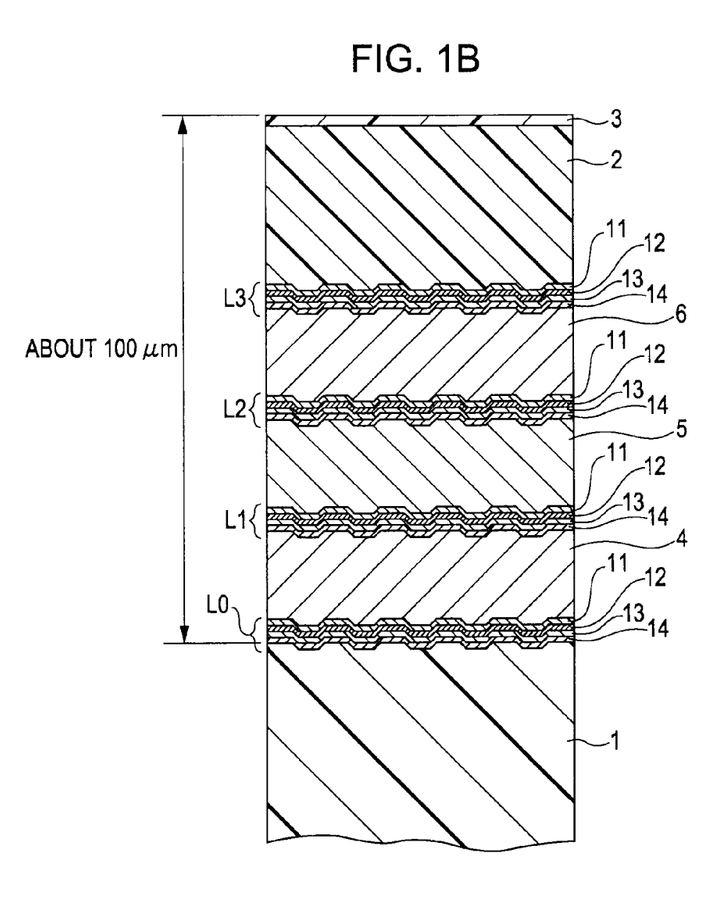

FIG. 1B shows a detailed structure of a structure including the recording layer L0 to the hard coat layer 3 within a thickness of 100 μm. In this example, the optical disc is a write-once disc. As shown in FIG. 1B, each of the recording layers L0, L1, L2, and L3 includes a dielectric film 11, a recording film 12, a dielectric film 13, and a reflection film 14. Here, the recording film 12 in each of the recording layers L0, L1, L2, and L3 is composed of a write-once phase change material, and the films are designed such that the amounts of signal from the individual layers are the same.

(Dielectric Film)

The thickness of the dielectric films 11 and 13 included in each of the recording layers L0, L1, L2, and L3 is preferably in a range of 3 to 100 nm and is determined in consideration of optical properties and thermal properties.

As a material for the dielectric films 11 and 13, a material having low absorbance at the recording/reproducing laser wavelength is preferable. Specifically, a material having an extinction coefficient K of 0.2 or less is preferable. Examples of such a material include a mixture of ZnS and $SiO_2$ (preferably, with a molar ratio of 4:1). Besides the mixture of ZnS and $SiO_2$, materials commonly used for dielectric films of optical disc recording media can also be used.

Examples thereof include metals and metalloids, such as Al, Si, Ta, Ti, Zr, Nb, Mg, B, Zn, Pb, Ca, La, and Ge, and nitrides, oxides, carbides, fluorides, sulfides, oxynitrides, carbonitrides, and oxycarbides thereof, and materials containing these as main components. Preferably usable examples include $AlN_X$ (0.5≤X≤1), AlN, $Al_2O_{3-X}$ (0≤X≤1), $Al_2O_3$, $Si_3N_{4-X}$ (0≤X≤1), $SiO_X$ (1≤X≤2), $SiO_2$, SiO, MgO, $Y_2O_3$, $MgAl_2O_4$, $TiO_X$ (1≤X≤2), $TiO_2$, $BaTiO_3$, $SrTiO_4$, $Ta_2O_{5-X}$ (0≤X≤1), $Ta_2O_5$, $GeO_X$ (1≤X≤2), SiC, ZnS, PbS, Ge—N, Ge—N—O, Si—N—O, $CaF_2$, LaF, $MgF_2$, NaF, and $ThF_4$.

(Recording Layer)

The thickness of the recording film 12 included in each of the recording layers L0, L1, L2, and L3 is preferably in a range of 5 to 30 nm, and, for example, about 15 nm.

As a material for the recording film 12, a phase change material that irreversibly changes state when irradiated with a laser beam can be used. As such a material, for example, a chalcogen compound or elemental chalcogen can be used. As the chalcogen compound, for example, a Sb—Te-based eutectic material can be used, and preferably, a Sb—Te-based eutectic material to which an additive element, such as Ge, is added can be used.

Examples thereof include Ge—Sb—Te-based, Sb—Te-based, In—Sb—Te-based, Ag—In—Sb—Te-based, Au—In—Sb—Te-based, Ge—Sb—Te—Pd-based, Ge—Sb—Te—Se-based, Ge—Sb—Te—Bi-based, Ge—Sb—Te—Co-based, and Ge—Sb—Te—Au-based compounds, or these compounds to which an additive gas, such as nitrogen or oxygen, is added.

When an additive element is added to the recording film 12, characteristics, such as reliability, can be improved, but signal characteristics are degraded. In view of this, the amount of the additive element in the recording film 12 is preferably 10 atomic percent or less.

(Reflection Film)

The thickness of the reflection film 14 included in each of the recording layers L0, L1, L2, and L3 is preferably 3 nm or more, and more preferably in a range of 5 to 60 nm. The reflection film 14 is designed so as to have an appropriate reflectance for each of the recording layers L0, L1, L2, and L3.

As a material for the reflection film 14, for example, a metal or a metalloid can be used. The material for the reflection film is preferably selected in consideration of reflecting power and thermal conductivity. Examples of the material includes metal elements, metalloid elements, and compounds or mixtures thereof which have reflecting power at the wavelength of the recording/reproducing laser beam and a thermal conductivity of 0.0004 to 4.5 J/(cm·K·s).

Specific examples of the material for the reflection film 14 include elements, such as Al, Ag, Au, Ni, Cr, Ti, Pd, Co, Si, Ta, W, Mo, and Ge, or alloys containing these elements as main components. Among them, in particular, Al-based, Ag-based, Au-based, Si-based, and Ge-based materials are preferred in view of practical use. As the alloys, for example, Al—Ti, Al—Cr, Al—Cu, Al—Mg—Si, Ag—Pd—Cu, Ag—Pd—Ti, and Si—B are preferably used.

Preferably, the material is selected from these materials in consideration of optical properties and thermal properties. For example, from the standpoint of high reflectance even in the short wavelength region, use of an Al-based or Ag-based material is preferable. In general, when the reflection film has a thickness that does not transmit light, for example, a thickness of 50 nm or more, the reflectance can be increased, and heat can be easily dissipated. When the thickness of the reflection film is set at an appropriate value, for example, about 10 nm, while increasing the transmittance, heat dissipation can be ensured.

Furthermore, the reflection film 14 is not limited to a single-layer structure. For example, the reflection film 14 can have a laminated structure in which two layers (reflection layers) each composed of a metal or a metalloid are laminated. Furthermore, a multilayer structure including three or more layers may be used. In such a manner, optical design can be easily carried out and balance with thermal properties can be easily achieved. In addition, a barrier layer composed of an SiN film or the like may be provided between the dielectric layer and the reflection layer.

(Spacer Layer)

Spacer layers 4, 5, and 6 are formed between the recording layers L0 and L1, between the recording layers L1 and L2, and between the recording layers L2 and L3, respectively. Each of the spacer layers 4, 5, and 6 is disposed by spin-coating an ultraviolet photosensitive, light-transmissive material constituting the multilayer structure of the optical disc recording medium, followed by curing with ultraviolet irradiation. When information signals are recorded/reproduced on/from the multilayer optical disc recording medium, the arrangement and thickness of the spacer layers 4, 5, and 6 are determined so as to suppress interlayer crosstalk.

(Cover Layer)

The cover layer 2 is formed for the purpose of protecting the optical disc. Recording/reproducing of information signals is performed, for example, by condensing a laser beam to any one of the recording layers L0, L1, L2, and L3 through the cover layer 2. In this example, the cover layer 2 is formed, for example, by spin coating of an ultraviolet curable resin and curing with ultraviolet irradiation. As the cover layer 2, a combination of an ultraviolet curable resin and a polycarbonate sheet or a combination of an adhesive layer and a polycarbonate sheet may be used. In the multilayer optical disc recording medium, the cover layer 2 is formed on the resin-molded substrate 1 such that the thickness of the cover layer 2 including the multilayer recording layer is 100 µm.

(Hard Coat Layer)

The hard coat layer 3 is formed for the purpose of protecting the optical disc as in the cover layer 2. In particular, the hard coat layer 3 is formed for the purpose of protecting recording/reproducing quality of information signals from mechanical impact, scratches, and adhesion of fingerprints during handling by the user to the optical disc.

As a material for the hard coat layer 3, a material to which fine silica gel powder is mixed in order to improve mechanical strength or a solvent type or non-solvent type ultraviolet curable resin can be used. The hard coat layer 3 is formed with a thickness of one to several microns so that high mechanical strength is exhibited and oil and fat components, such as fingerprints, are repelled.

A method of manufacturing an optical disc having the layer structure described above according to the embodiment of the present invention will be described with reference to FIGS. 2A to 4C. FIGS. 2A to 3E are schematic diagrams showing the steps in the method of manufacturing an optical disc, and FIGS. 4A to 4C are flowcharts illustrating the steps in the manufacturing method.

Here, description will be made from the step of forming a resin-molded substrate using a stamper. The stamper is prepared by the preceding steps of mastering, development, and stamper formation. Since this example relates to a four-layer disc, stampers corresponding to the individual recording layers L0, L1, L2, and L3 are formed. In the steps shown in FIGS. 2A to 3E, these stampers are used.

Figure 4A:
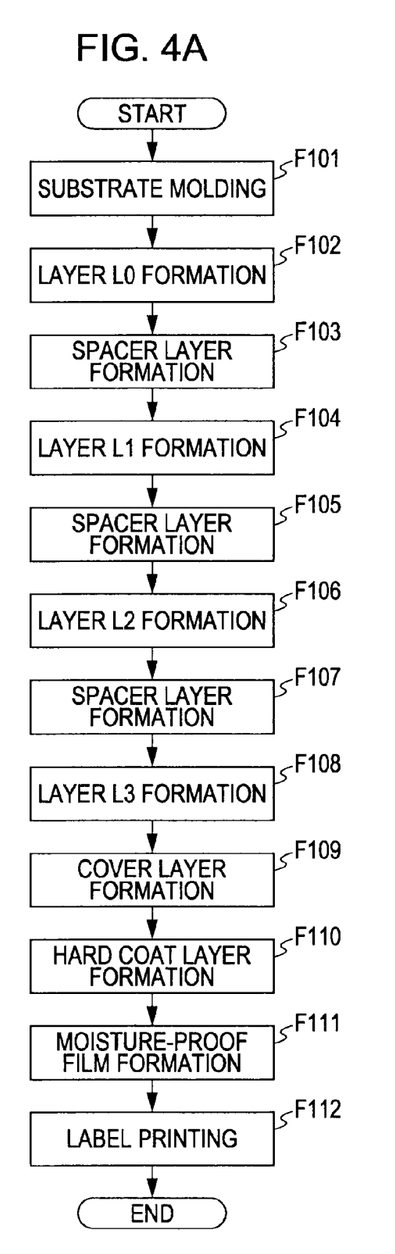
FIGS. 4A to 4C are flowcharts illustrating the steps in the method of manufacturing a disc according to the embodiment.
Figure 4B:
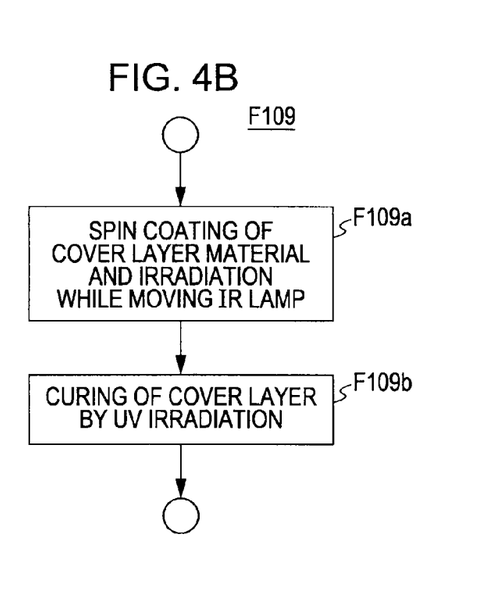
Figure 4C:
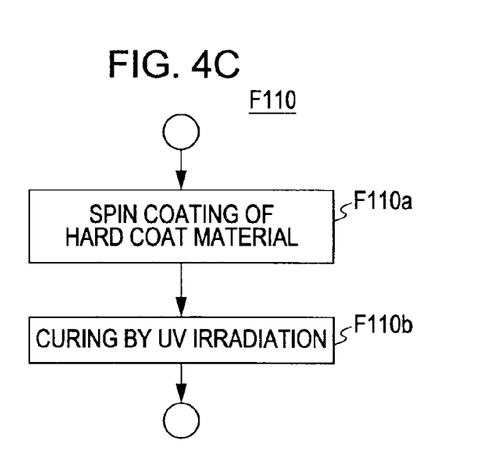

In step F101 shown in FIG. 4A, a resin-molded substrate 1 is molded. For example, the resin-molded substrate 1 is formed by injection molding of a polycarbonate resin. The resin-molded substrate 1 molded in this step has an irregular pattern (groove or pit pattern) which constitutes the recording layer L0.

Figure 2A:
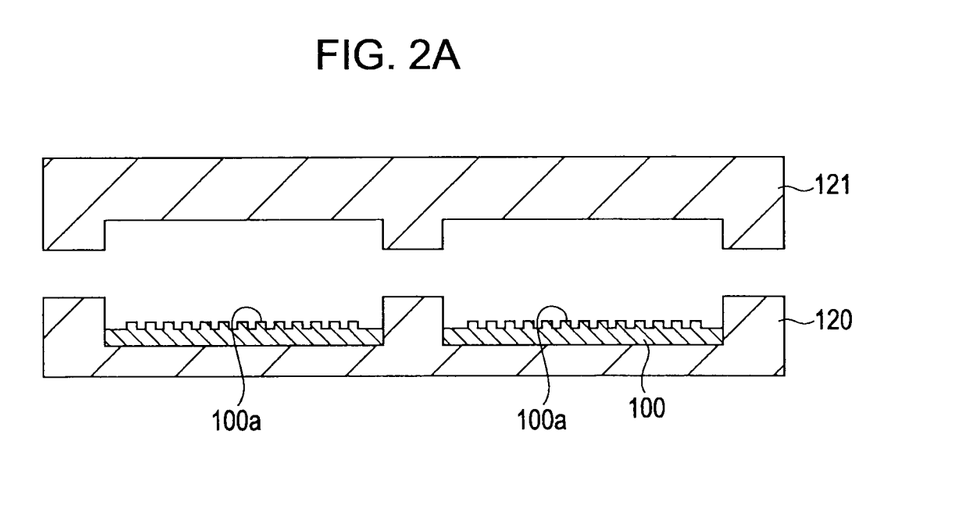
FIGS. 2A to 2C are schematic diagrams showing the steps in a method of manufacturing a disc according to the embodiment.
Figure 3A:
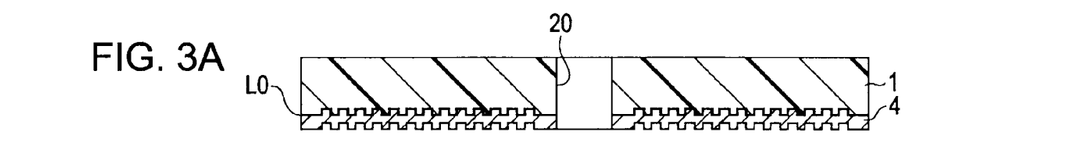
FIGS. 3A to 3E are schematic diagrams showing the steps in the method of manufacturing a disc according to the embodiment.
Figure 3B:
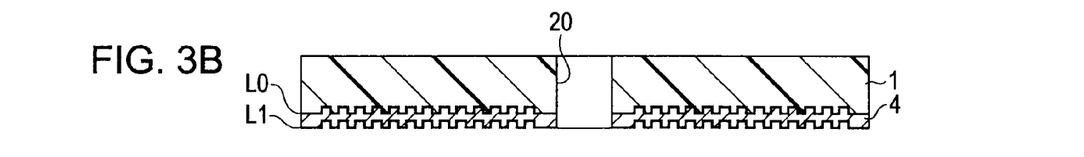
Figure 3C:
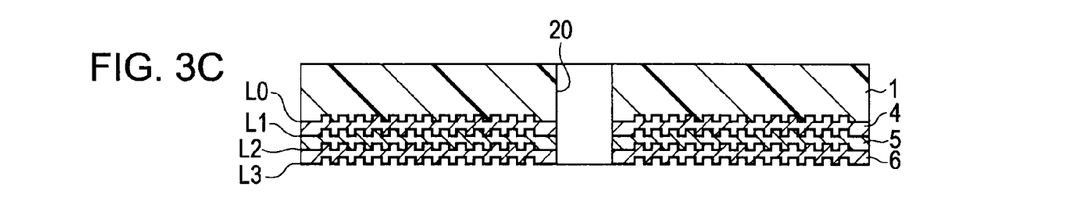
Figure 3D:
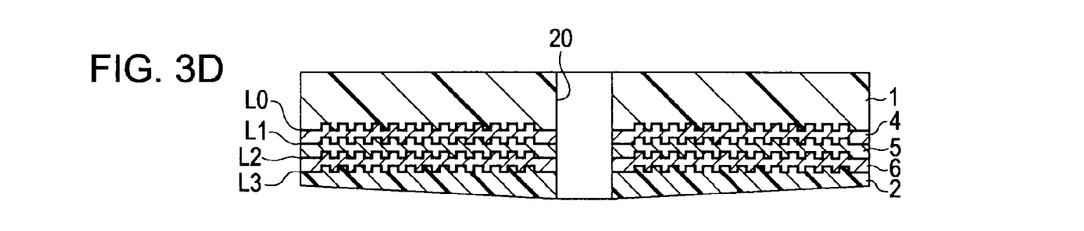
Figure 3E:
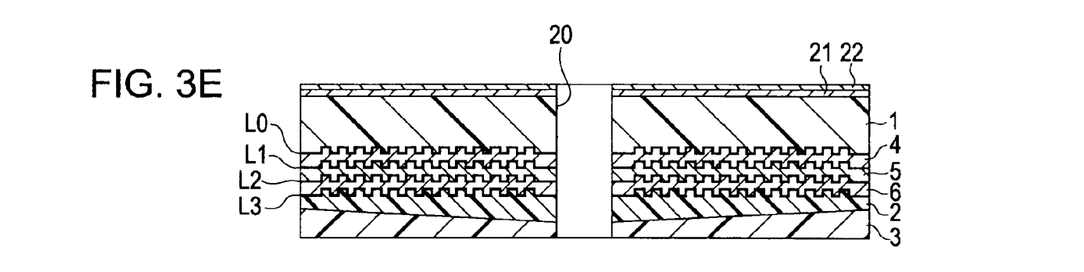

FIG. 2A schematically shows a die used for molding the resin-molded substrate 1. The die includes a lower cavity 120 and an upper cavity 121. A stamper 100 used for transferring an irregular pattern for the recording layer L0 is disposed in the lower cavity 120. The stamper 100 is provided with an irregular pattern 100*a* for transfer.

Figure 2B:
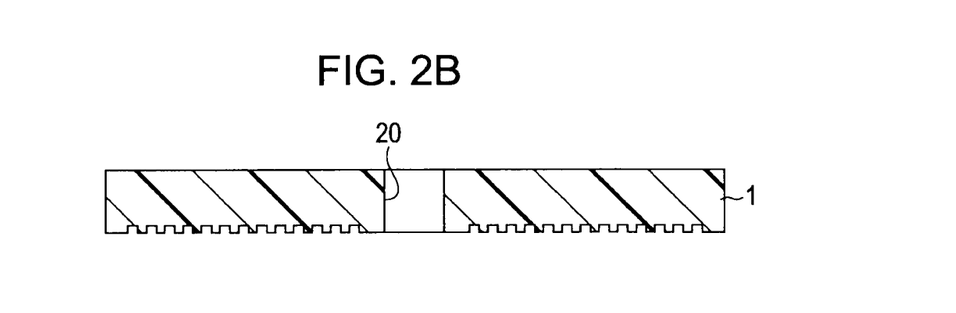

Using such a die, the resin-molded substrate 1 is formed by injection molding. The resulting resin-molded substrate 1 is shown in FIG. 2B. The resin-molded substrate 1 composed of a polycarbonate resin has a center hole 20. The irregular pattern 100*a* formed in the stamper 100 in the die has been transferred to one surface of the resin-molded substrate 1, thus constituting an irregular pattern of the recording layer L0.

Figure 2C:
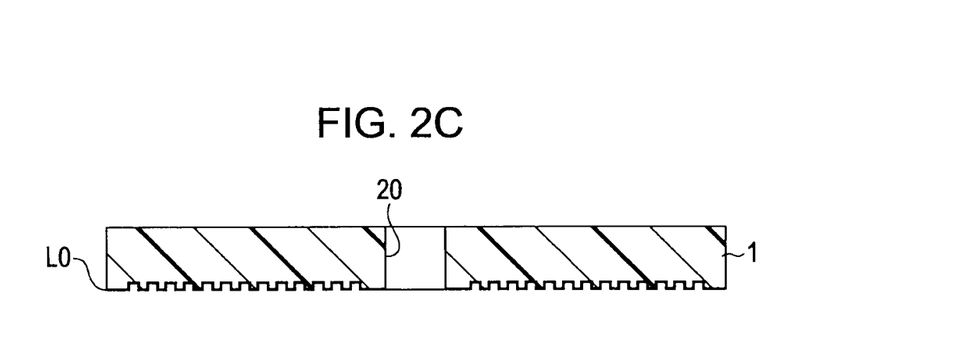

Subsequently, in step F102 shown in FIG. 4A, the recording layer L0 is formed. That is, a reflection film 14, a dielectric film 13, a recording film 12, and a dielectric film 11 are deposited by sputtering in that order on the irregular pattern of the resin-molded substrate 1. Thereby, the recording layer L0 is formed as shown in FIG. 2C.

Next, in step F103, a spacer layer 4 is formed. In this case, as shown in FIG. 2C, an ultraviolet curable resin is spread by spin coating on the substrate surface provided with the recording layer L0, and the resin is cured by irradiation of ultraviolet light with a stamper for the recording layer L1 (not shown) being pressed thereagainst. When the stamper is separated, as shown in FIG. 3A, a spacer layer 4 having an irregular pattern for the recording layer L1 is formed on the resin-molded substrate 1.

Next, in step F104, the recording layer L1 is formed. That is, a reflection film 14, a dielectric film 13, a recording film 12, and a dielectric film 11 are deposited by sputtering in that order on the irregular pattern of the spacer layer 4. Thereby, the recording layer L1 is formed as shown in FIG. 3B.

Subsequently, a spacer layer 5 is formed in step F105, the recording layer L2 is similarly formed in step F106, a spacer layer 6 is formed in step F107, and the recording layer L3 is similarly formed in step F108. In this stage, as shown in FIG. 3C, the recording layers L0, L1, L2, and L3 are disposed on the resin-molded substrate 1.

Subsequently, in step F109, a cover layer 2 is formed. The cover layer 2 is formed by spin coating of an ultraviolet curable resin and curing by ultraviolet irradiation. As shown in FIG. 3D, which shows the workpiece in an exaggerated manner for the purpose of explanation, the cover layer 2 is formed such that its thickness decreases from the central portion to the peripheral portion of the disc.

FIG. 4B is a flowchart showing the process in step F109. First, in step F109*a*, spin coating of a cover layer material (ultraviolet curable resin) is performed. In this step, irradiation is performed while moving an IR (far-infrared) lamp in a radial direction in response to spreading of the ultraviolet curable resin by spin coating. As will be described later, by controlling the movement of the IR lamp, the resin can be spread such that the thickness is small in the peripheral portion. Then, in step F109*b*, the entire surface is irradiated with ultraviolet light to thereby cure the spread ultraviolet curable resin. The cover layer 2 is thereby formed.

Next, in step F110, a hard coat layer 3 is formed. The hard coat layer 3 is formed by spin coating of an ultraviolet curable resin as a material suitable for surface protection, followed by curing with ultraviolet irradiation. As shown in FIG. 3E, the hard coat layer 3 is formed such that its thickness increases from the central portion to the peripheral portion of the disc.

FIG. 4C is a flowchart showing the process in step F110. First, in step F110*a*, spin coating of a hard coat material (ultraviolet curable resin) is performed. In this step, unlike the formation of the cover layer 2, irradiation while moving an IR lamp is not performed. As will be described later, it is possible to form the hard coat layer so that its thickness increases toward the peripheral portion even if a control is not particularly performed. In step F110*b*, the entire surface is irradiated with ultraviolet light to thereby cure the spread ultraviolet curable resin. The hard coat layer 3 is thereby formed. In this case, the total thickness of the cover layer 2 and the hard coat layer 3 is substantially uniform from the central portion to the peripheral portion of the disc.

Then, in step F111, a moisture-proof film 21 is formed on a label surface side (opposite to the laser incident surface side). In some cases, the moisture-proof film 21 may not be formed. Finally, in step F112, printing is performed on the label surface side of the resin-molded substrate 1 having the layer structure described above. For example, a white coating is applied entirely over the label surface side by offset printing, and color printing is performed thereon. A printing layer 22 is thereby formed. After undergoing testing, the optical disc is completed.

Figure 5:
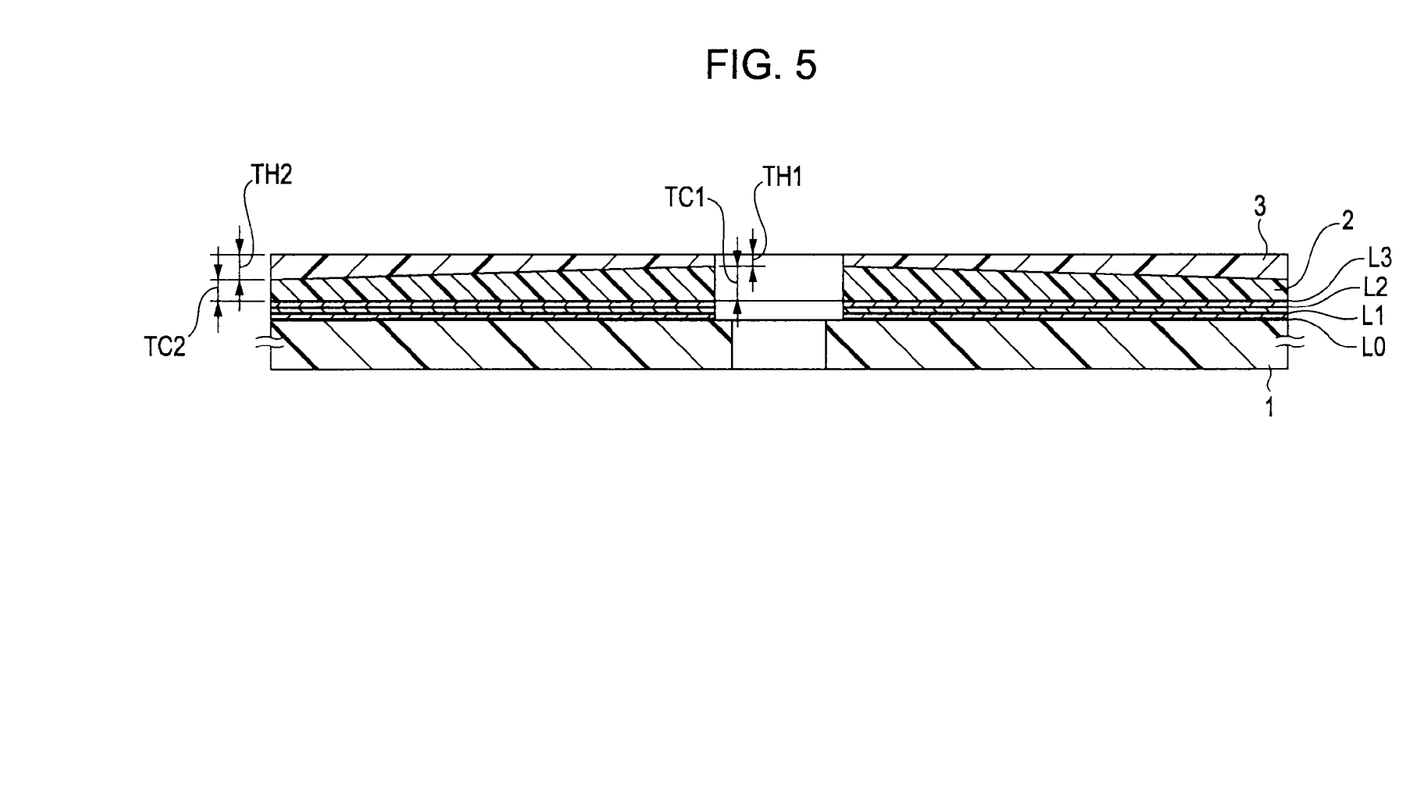
FIG. 5 is a schematic diagram of an optical disc according to the embodiment.

The optical disc according to the embodiment is manufactured as described above and characterized by the cover layer 2 and the hard coat layer 3. That is, as shown in FIG. 5, which is a schematic diagram showing a layer structure of the optical disc, the cover layer 2 is formed such that its thickness decreases from the central portion to the peripheral portion of the disc, and the hard coat layer 3 is formed such that its thickness increases from the central portion to the peripheral portion of the disc. The total thickness of the cover layer 2 and the hard coat layer 3 is substantially uniform from the central portion to the peripheral portion of the disc. This feature will be described below in detail.

In general, when coating of a photocurable resin or the like is performed by a spin coating method, the coating thickness is expressed by the following expression:

$$d(r) = \sqrt{(3\eta/4\rho\omega^2 t)} * (1-r0/r)^{4/3} \quad \text{(Expression 1)}$$

wherein
  d(r): Coating thickness at a distance from center of rotation
  η: Viscosity [mPa·s]
  ρ: Density [g/cm$^3$]
  ω: Angular rate of rotation [2πf]
  t: Time of rotation
  r0: Coating starting position
  r: Distance from center of rotation Expression 1 means that in a spin coating method, if the viscosity and density of a coating material, the number of rotations in the coating process, and the coating starting position are set, the thickness in the substrate radial direction is determined.

Figure 6:
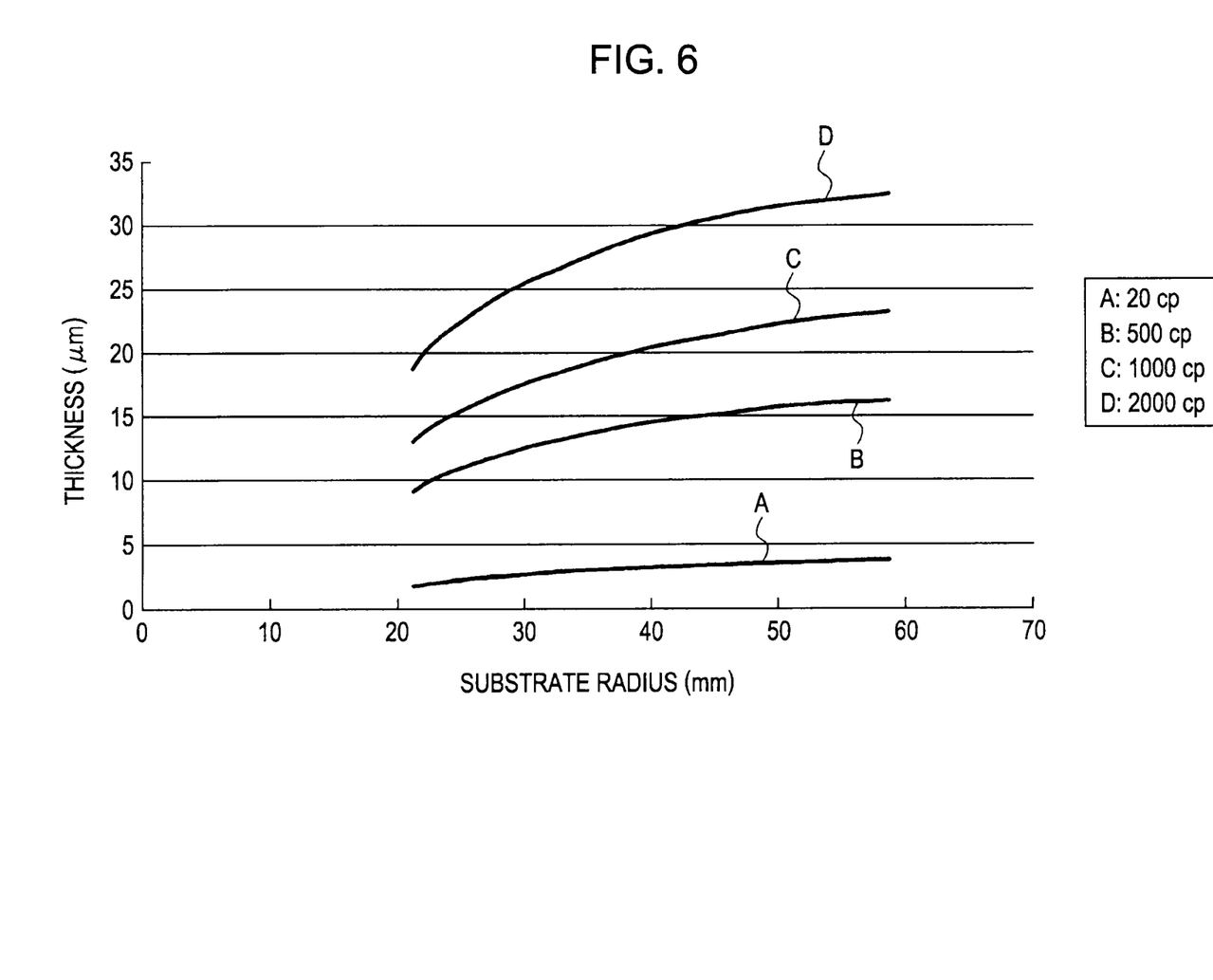
FIG. 6 is a graph showing the thickness distribution of light-transmissive resin films in the radial direction.

FIG. 6 is a graph showing the calculation results of the thickness distribution in the radial direction with respect to coating materials having four viscosities: 20, 500, 1000, and 2000 mPa·s (=cP). The horizontal axis indicates the radial position of the resin-molded substrate 1, and the vertical axis indicates the thickness. As is evident from FIG. 6, the thickness increases from the central portion to the peripheral portion of the disc. It can also be analogized that when the coating starting position is the same as the center of rotation, the coating thickness becomes uniform.

An increase in the thickness toward the peripheral portion does not satisfy the original demand for uniformity in the thickness. Therefore, various measures have been taken in order to obtain uniformity in the coating thickness. For example, in one method, a cap composed of a metal is disposed in the center of the substrate so that the coating starting position is brought closer to the center as much as possible. In another method, using an IR (near-infrared) lamp, sweeping is performed from the central portion toward the outer peripheral portion of the substrate during spin coating so that uniform thickness distribution can be obtained. In the example according to the embodiment of the present invention, when the cover layer 2 is formed, using such a method of obtaining uniformity in the thickness, reversely, the thickness is decreased from the central portion to the peripheral portion of the substrate.

Figure 7:
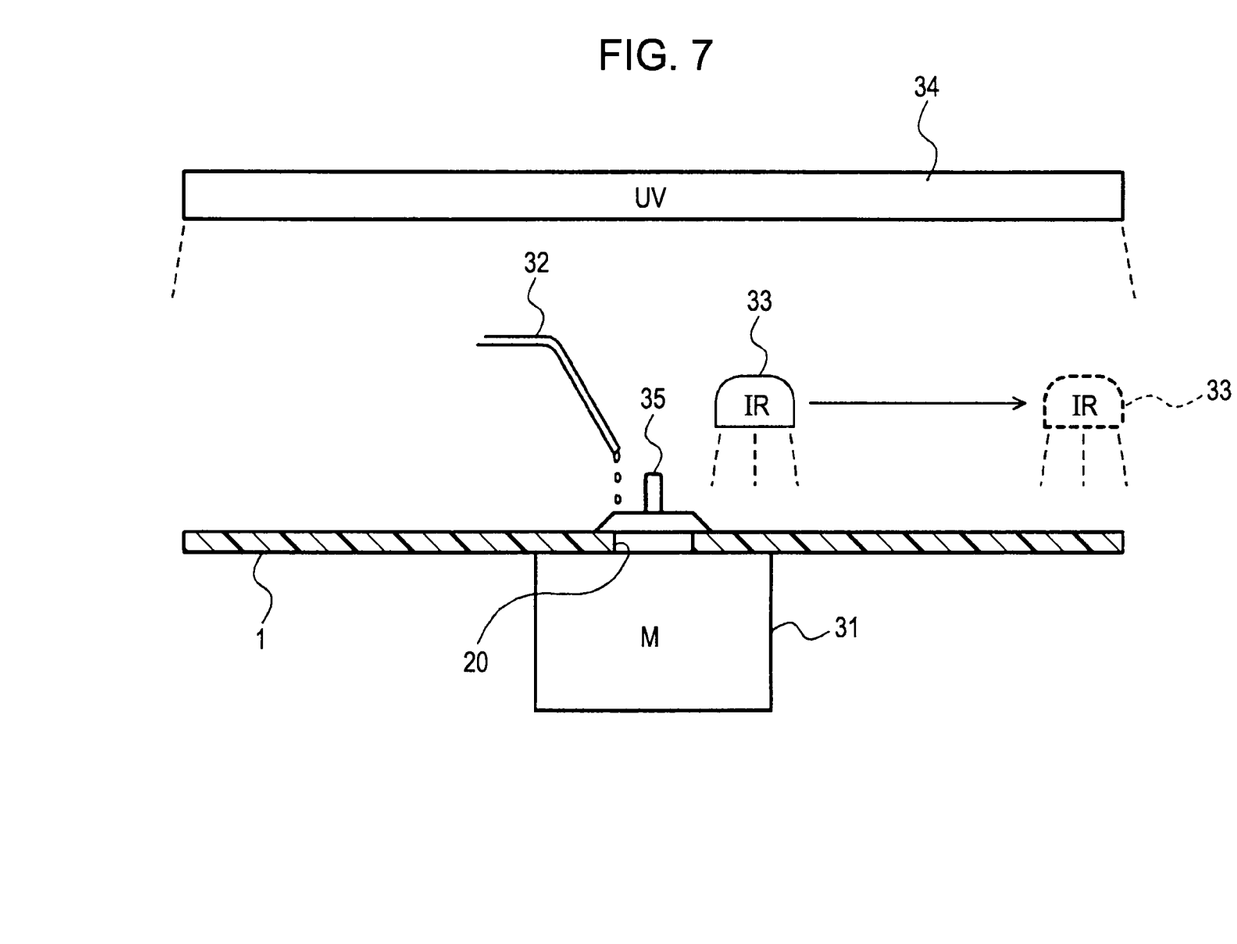
FIG. 7 is a schematic diagram showing the spin coating step in the process of forming a cover layer according to the embodiment.

A spin coating process is schematically shown in FIG. 7. In the spin coating process for forming the cover layer 2, a resin-molded substrate 1 in the state shown in FIG. 3C is placed in a spin coating apparatus and rotated at high speed by a motor 31. In this case, a cap 35 is fitted into a center hole 20, and an ultraviolet curable resin is added dropwise from a resin supply nozzle 32 onto the cap 35. The dropwise added ultraviolet curable resin is spread over the resin-molded substrate 1 by the centrifugal force occurring during rotation of the resin-molded substrate 1 caused by the motor 31. Here, an IR lamp 33 is movable in a radial direction above the resin-molded substrate 1, and during spin coating, the IR lamp performs far-infrared irradiation while moving.

The thickness can be controlled by setting various conditions, such as the spreading speed due to the centrifugal force, heat due to infrared irradiation, and the amount of the resin supplied. In order to achieve uniformity in the thickness, under the predetermined conditions of the amount of the resin supplied and the rotation speed, the amount of heat of infrared irradiation and the moving speed of the irradiation position in the radial direction are controlled.

For example, by adjusting the moving speed of the IR lamp 33 equal to the spreading speed of the resin, it is possible to obtain the uniform thickness from the inner periphery to the outer periphery. Here, by adjusting the moving speed slower than the spreading speed so as to control the thermal storage at each radial position, the thickness in the peripheral portion can be decreased.

Heating by infrared irradiation decreases the viscosity of the resin. Therefore, by increasing the storage of heat toward the peripheral portion so as to decrease the viscosity, the thickness of the outer peripheral portion can be decreased.

Such a control is performed in step F109a shown in FIG. 4B. Then, in step F109b, ultraviolet irradiation is performed by a UV lamp 34 so that the spread resin is cured.

Meanwhile, in the process of forming the hard coat layer 3, as described with reference to FIG. 4C, without using the IR lamp 33, the resin is spread by spin coating and cured by ultraviolet irradiation. That is, in the process of forming the hard coat layer 3, the change in the thickness is obtained by the spin coating method on the basis of Expression 1.

Figure 8:
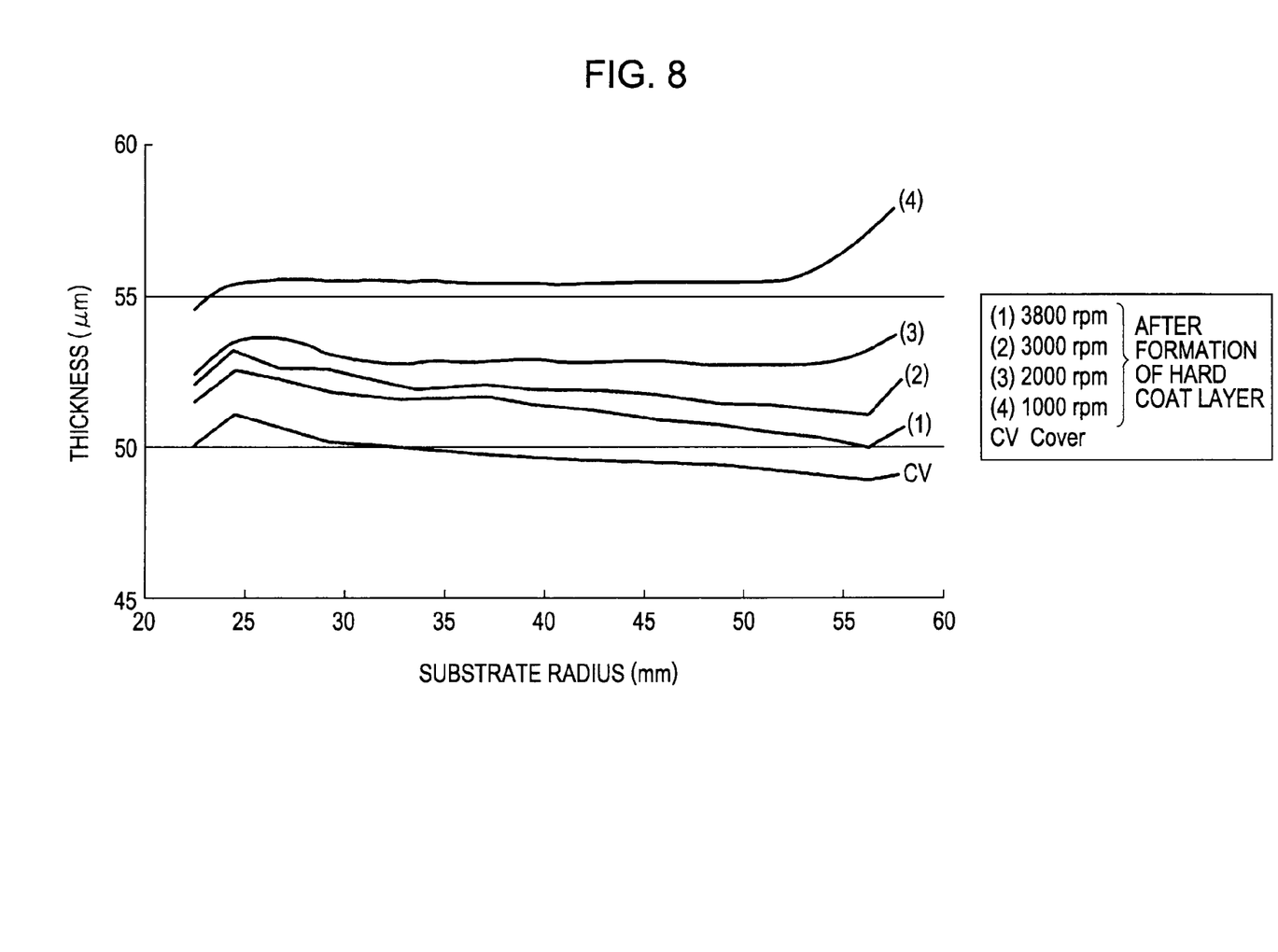
FIG. 8 is a graph showing the thickness distribution of cover layers and hard coat layers according to the embodiment.

FIG. 8 is a graph showing the thickness distribution of the protective layer (the cover layer 2 and the hard coat layer 3). The horizontal axis indicates the radial position of the resin-molded substrate 1, and the vertical axis indicates the thickness.

In the graph, the thickness distribution CV shows the thickness distribution of the cover layer 2 formed such that the thickness decreases toward the outer peripheral portion as described above. The thickness distributions (1), (2), (3), and (4) show the cases where hard coat layers 3 are formed at spin-coating rotation speeds of 3800 rpm, 3000 rpm, 2000 rpm, and 1000 rpm after cover layers 2 are formed, for example, so as to have the thickness distribution CV. The thickness shown in each of the thickness distributions (1), (2), (3), and (4) corresponds to the total thickness of the cover layer 2 and the hard coat layer 3.

For example, in this case, when the number of rotations in the spin coating of the hard coat layer 3 is set at 1000 rpm, it is possible to obtain substantially the uniform thickness in a region (e.g. radial position: 23 to 53 mm) including the effective region on the optical disc. That is, only by appropriately selecting the number of rotations, it is possible to form the hard coat layer 3 such that the thickness increases from the central portion to the peripheral portion of the disc and the total thickness of the cover layer 2 and the hard coat layer 3 is substantially uniform from the central portion to the peripheral portion of the disc.

When spin coating of a hard coat material having a low viscosity is performed, it is usually difficult to control the thickness. However, according to the embodiment of the present invention, it is possible to form a uniform protective layer with low cost, without a special process, such as use of the IR lamp 33.

FIG. 8 shows that, as a result of an experiment, on the condition that the cover layer 2 has a surface inclination as the thickness distribution CV, and a certain hard coat material is used, it is possible to have substantially the uniform thickness from the inner periphery to the outer periphery when the number of spin-coating rotations of the hard coat material is set at 1000 rpm. It is to be noted, if the inclination rate of the cover layer 2 and the hard coat material are different, the optimum number of rotations during the formation of the hard coat layer is different.

As described above, when the cover layer 2 is formed, the thickness is controlled using the IR lamp 33 so that the thickness decreases toward the outer peripheral portion. When the hard coat layer 3 is formed, spin coating is performed at an appropriate number of rotations. As a result, it is possible to obtain a uniform thickness of a protective layer which is a combination of the cover layer 2 and the hard coat layer 3.

In the related art, each of the cover layer and the hard coat layer is formed with a uniform thickness, resulting in a decrease in efficiency in the manufacturing process. In particular, it is difficult to form, with a uniform thickness, a hard coat layer 3 having a thickness of two to several microns, using a low-viscosity material. In contrast, in this example, when the cover layer 2 is formed, using the commonly used technique of obtaining uniformity in the thickness, the thickness is decreased toward the outer peripheral portion. When the hard coat layer 3 is formed, only spin coating is performed at an appropriate number of rotations, and difficult thickness control is not performed. Therefore, the optical disc can be manufactured efficiently, with high process consistency, with low cost, and with high quality.

Preferably, the cover layer 2 is formed such that its thickness decreases from the central portion to the outer peripheral portion of the disc at an inclination rate of 90% or more. For example, referring to FIG. 5, the thickness TC2 of the outer peripheral portion is 90% or more relative to the thickness TC1 of the central portion.

As shown in FIG. 8, the thickness increases in the outermost periphery of the disc, and the thickness decreases in the innermost periphery. Here, the thickness TC1 of the central portion and the thickness TC2 of the outer peripheral portion are respectively defined as the thickness of the thickest portion and the thickness of the thinnest portion excluding the outermost periphery and the innermost periphery.

As described above, in the case of the four-layer disc, the thickness of the cover layer 2 is, for example, about 55 μm. In such a case, the fact that the thickness of the peripheral portion is 90% or more relative to the thickness of the central portion means that the difference in the thickness between the thickest portion and the thinnest portion is 5.5 μm or less. This is a range in which it is easy to obtain a uniform total thickness by burying the difference in the thickness between the central portion and the peripheral portion by the hard coat layer 3.

Furthermore, with respect to the hard coat layer 3, referring to FIG. 5, preferably, the inclination rate is set such that the thickness TH2 of the outer peripheral portion is 300% or less relative to the thickness TH1 of the central portion. This means, for example, the thickness changes in a range of 1 to 3 μm. The reason for this is that if the thickness becomes too large, it may be difficult to satisfactorily form the hard coat layer.

As described above, when the protective layer structure (the cover layer and the hard coat layer) of the optical disc recording medium according to the embodiment of the present invention is used, one precise control step can be eliminated in the manufacturing process, which is industrially significant. Specifically, the protective layer structure can be used as a cost-down process.

Furthermore, although a four-layer disc is described as an example in the embodiment, the structure of the embodiment is of course applicable to a single-layer disc, a two-layer disc, a three-layer disc, or a five or more-layer disc. That is, even in the case of a single-layer disc or a multilayer disc including two or more layers, it is possible to provide multilayer write-once optical disc recording media, rewritable optical disc recording media, and read-only optical disc recording media in which recording layers are formed within a thickness range of 0.1 mm, recording/reproducing characteristics and productivity are excellent, and cost reduction can be achieved. The spirit of the embodiment of the present invention can also be used widely when spacer layers are formed.

The present application contains subject matter related to that disclosed in Japanese Priority Patent Application JP 2008-199647 filed in the Japan Patent Office on Aug. 1, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc recording medium comprising:
a disc substrate;
at least one recording layer disposed on a surface side of the disc substrate;
a cover layer disposed on a laser incident surface side of the recording layer and composed of a light-transmissive resin layer; and
a hard coat layer disposed on a laser incident surface side of the cover layer and composed of a light-transmissive resin, the hard coat layer having a thickness that increases from the central portion to the peripheral portion of the optical disc in a range of one to three micrometers,
wherein the cover layer is formed such that the thickness of the cover layer decreases from the central portion to the peripheral portion of the optical disc, wherein the total thickness of the cover layer and the hard coat layer is substantially uniform from the central portion to the peripheral portion of the optical disc, and the cover layer comprises a combination of an ultraviolet (UV)curable resin and a polycarbonate sheet or a combination of an adhesive layer and a polycarbonate sheet.

2. The optical disc recording medium according to claim 1, wherein a plurality of recording layers are disposed as the recording layer between the disc substrate and the cover layer.

3. The optical disc recording medium according to claim 1, wherein the cover layer is formed such that the thickness of the cover layer decreases from the central portion to the peripheral portion of the optical disc at an inclination rate of 90% or more, the inclination rate being defined as a percentage of the thickness of the outer peripheral portion relative to the thickness of the central portion of the cover layer.

4. The optical disc recording medium according to claim 1, wherein the cover layer is formed by spin coating a light-transmissive resin material, and controlling movement of a source of infrared radiation radially outward from the central portion to the peripheral portion of the optical disc for the infrared irradiation of the light-transmissive resin material that forms the light-transmissive resin layer of the cover layer.

5. The optical disc recording medium according to claim 4, wherein the cover layer is formed by UV curing after the spin coating and the infrared irradiation of the light-transmissive resin material.

6. The optical disc recording medium according to claim 4, wherein a speed of the movement radially outward, from the central portion to the peripheral portion of the optical disc, of the source of infrared radiation, is less than a spreading speed of the light-transmissive resin material.

7. The optical disc recording medium according to claim 1, wherein the hard coat layer is formed by spin coating and ultraviolet irradiation of a laser incident surface of the light-transmissive resin.

8. The optical disc recording medium according to claim 1, wherein the hard coat layer is formed based on a number of spin coating rotations, the number of spin coating rotations to form the hard coat layer being different from a number of spin coating rotations to form the cover layer.

9. A method of manufacturing an optical disc comprising:
molding a disc substrate;
forming at least one recording layer on a surface side of the disc substrate;
forming a cover layer composed of a light-transmissive resin layer on a laser incident surface side of the recording layer such that the thickness of the cover layer decreases from the central portion to the peripheral portion of the optical disc, the forming of the cover layer comprising spin coating a light-transmissive resin material and infrared irradiation of the light-transmissive resin material; and
forming a hard coat layer composed of a light-transmissive resin for surface protection on a laser incident surface side of the cover layer, the hard coat layer having a thickness that increases from the central portion to the peripheral portion in a range of one to three micrometers, and the total thickness of the cover layer and the hard coat layer is substantially uniform from the central portion to the peripheral portion of the optical disc.

10. The method according to claim 9, wherein the light-transmissive resin layer of the cover layer comprises a combination of a UV curable resin and a polycarbonate sheet or a combination of an adhesive layer and a polycarbonate layer.

11. The method according to claim 9, wherein the forming of the cover layer comprises the spin coating and movement of a source of infrared radiation radially outward, from the central portion to the peripheral portion of the optical disc, for the infrared irradiation of the light-transmissive resin material.

12. The method according to claim 11, wherein the forming of the cover layer comprises ultraviolet (UV) curing after the spin coating and the infrared irradiation of the light-transmissive resin material.

13. The method according to claim 9,
wherein the forming of the hard coat layer comprises spin coating the light-transmissive resin, and ultraviolet irradiation of a laser incident surface of the light-transmissive resin.

14. A method of manufacturing an optical disc comprising:
forming at least one recording layer on a disc substrate;
forming a cover layer of a light-transmissive resin layer on a surface side of the recording layer such that the cover layer decreases in thickness from the center portion of the optical disc to the peripheral portion of the optical disc, the forming of the cover layer comprising spin coating a light-transmissive resin material and infrared irradiation of the light-transmissive resin material; and
forming a hard coat layer of a light-transmissive resin on an incident surface of the cover layer, the hard coat layer increasing in thickness from the center portion to the peripheral portion of the optical disc,
wherein a total thickness of the cover layer and the hard coat layer is substantially uniform from the center portion to the peripheral portion.

15. The method according to claim 14,
wherein the forming of the hard coat layer comprises spin coating the light-transmissive resin, and ultraviolet irradiation of a laser incident surface of the light-transmissive resin.

16. The method according to claim 14,
wherein a speed of movement of a source of infrared radiation radially outward, from the center portion to the peripheral portion of the optical disc, is less than a spreading speed of the light-transmissive resin material forming the light-transmissive resin layer of the cover layer.

17. The method according to claim 14,
wherein the light-transmissive resin material forms the light-transmissive resin layer of the cover layer, wherein the cover layer comprises a combination of an ultraviolet (UV)curable resin and a polycarbonate sheet or a combination of an adhesive layer and a polycarbonate layer.

* * * * *